US009027038B2

(12) United States Patent
Matthews

(10) Patent No.: US 9,027,038 B2
(45) Date of Patent: May 5, 2015

(54) METHODS AND APPARATUS FOR CONSTRUCTING A SECURE AND FLEXIBLE OPERATING SYSTEM

(75) Inventor: Joshua Scott Matthews, Baltimore, MD (US)

(73) Assignee: General Dynamics C4 Systems, Inc., Scottsdale, AZ (US)

(*) Notice: Subject to any disclaimer, the term of this patent is extended or adjusted under 35 U.S.C. 154(b) by 819 days.

(21) Appl. No.: 12/603,019

(22) Filed: Oct. 21, 2009

(65) Prior Publication Data
US 2011/0093869 A1 Apr. 21, 2011

(51) Int. Cl.
G06F 3/00 (2006.01)
G06F 9/44 (2006.01)
G06F 9/46 (2006.01)
G06F 13/00 (2006.01)
G06F 9/54 (2006.01)
G06F 21/53 (2013.01)
H04L 29/06 (2006.01)
H04L 29/08 (2006.01)

(52) U.S. Cl.
CPC ............... G06F 9/546 (2013.01); G06F 21/53 (2013.01); G06F 2221/2119 (2013.01); H04L 63/168 (2013.01); H04L 67/36 (2013.01); H04L 67/02 (2013.01)

(58) Field of Classification Search
None
See application file for complete search history.

(56) References Cited

U.S. PATENT DOCUMENTS

| 2005/0120160 | A1 | 6/2005 | Plouffe et al. |
| 2006/0048133 | A1 | 3/2006 | Patzachke et al. |
| 2007/0050764 | A1 | 3/2007 | Traut |
| 2007/0074192 | A1 | 3/2007 | Geisinger |
| 2007/0136579 | A1* | 6/2007 | Levy et al. ............... 713/168 |
| 2007/0245338 | A1 | 10/2007 | Musha |
| 2009/0089860 | A1* | 4/2009 | Forrester et al. .......... 726/3 |

OTHER PUBLICATIONS

Robert Whitis, Browser Based Operating Systems—Stregths and Weaknesses of Browser Based Operating Systems, Jul. 1, 2009, Yahoo.com, pp. 1-3.*
Tang et al., University of Illinois at Urbana-Champaign, "Trust and Protection in Illinois Browser Operating System."*
Whitis, Robert, Yahoo.com, "Browser Based Operating Systems Strengths and Weaknesse[s] of Browser Based Operating Systems." Jun. 1, 2009.*
Tech-Tweak.com, "Browser Based Operating Systems Reviewed."*
Redferret.net "EyeOS 1.0—the Operating System Comes to the Browser."*
Resig, John, ejohn.org, "The Browser Operating System.", Feb. 22, 2009.*
Techdirt.com, "The Browser is the New Operating System.", Jun. 16, 2008.*
Malik, Om, Money.cnn.com, "Microsoft's Big Nightmare: Free Online Apps, a New Generation of Browsers is About to Make Web Applications Better than Downloadable Desktop Software." Mar. 15, 2007.*
Mohta, Ashish, Technospot.net, "Browser Based Operating System.", Mar. 2, 2007.*

(Continued)

Primary Examiner — Craig Dorais
(74) Attorney, Agent, or Firm — Ingrassia, Fisher & Lorenz, P.C.

(57) ABSTRACT

The present disclosure provides methods and apparatus for constructing a secure and flexible operating system. The presently disclosed system executes different user applications in different operating systems on different virtual machines. Each user application communicates with other processes via the hypertext transfer protocol (HTTP). In particular, each user application's user interface is implemented in a web browser that is running in its own operating system on its own virtual machine, and each user application interacts with the user interface by exchanging HTTP messages between the virtual machines.

16 Claims, 4 Drawing Sheets

(56) References Cited

OTHER PUBLICATIONS

Anthony, Sebastian, Extremetech.com, "Windows 8: Microsoft's Browser-based OS.", Sep. 13, 2011.*

International Search Report and Written Opinion for International Application PCT/US10/51471, dated Dec. 2, 2010.
International Search Report for PCT/US2010/051471 mailed Apr. 24, 2012.

* cited by examiner

METHODS AND APPARATUS FOR CONSTRUCTING A SECURE AND FLEXIBLE OPERATING SYSTEM

TECHNICAL FIELD

The present application relates in general to computing devices and more specifically to methods and apparatus for a secure and flexible operating system.

BACKGROUND

As more applications become downloadable from unknown third parties, security becomes more of an issue. For example, hundreds of applications are available for some smart phones from hundreds of different sources. Users of these applications do not want malicious or faulty code interfering with the use of their device. In addition, handset designers typically must select a single operating system on which to base their handsets.

SUMMARY

The presently disclosed system solves this problem by executing different user applications in different operating systems on different virtual machines. Each user application communicates with other processes via the hypertext transfer protocol (HTTP). In particular, each user application's user interface is implemented in a web browser that is running in its own operating system on its own virtual machine, and each user application interacts with the user interface by exchanging HTTP messages between the virtual machines. Using the methods and apparatus disclosed herein, mobile handset designers are able to construct an entire mobile operating system using web technologies, and still allow developers to use the operating system frameworks from other operating systems such as Android.

DETAILED DESCRIPTION

The present disclosure provides methods and apparatus for constructing a secure and flexible operating system. The presently disclosed system executes different user applications in different operating systems on different virtual machines. Each user application communicates with other processes via the hypertext transfer protocol (HTTP). In particular, each user application's user interface is implemented in a web browser that is running in its own operating system on its own virtual machine, and each user application interacts with the user interface by exchanging HTTP messages between the virtual machines.

Figure 1:
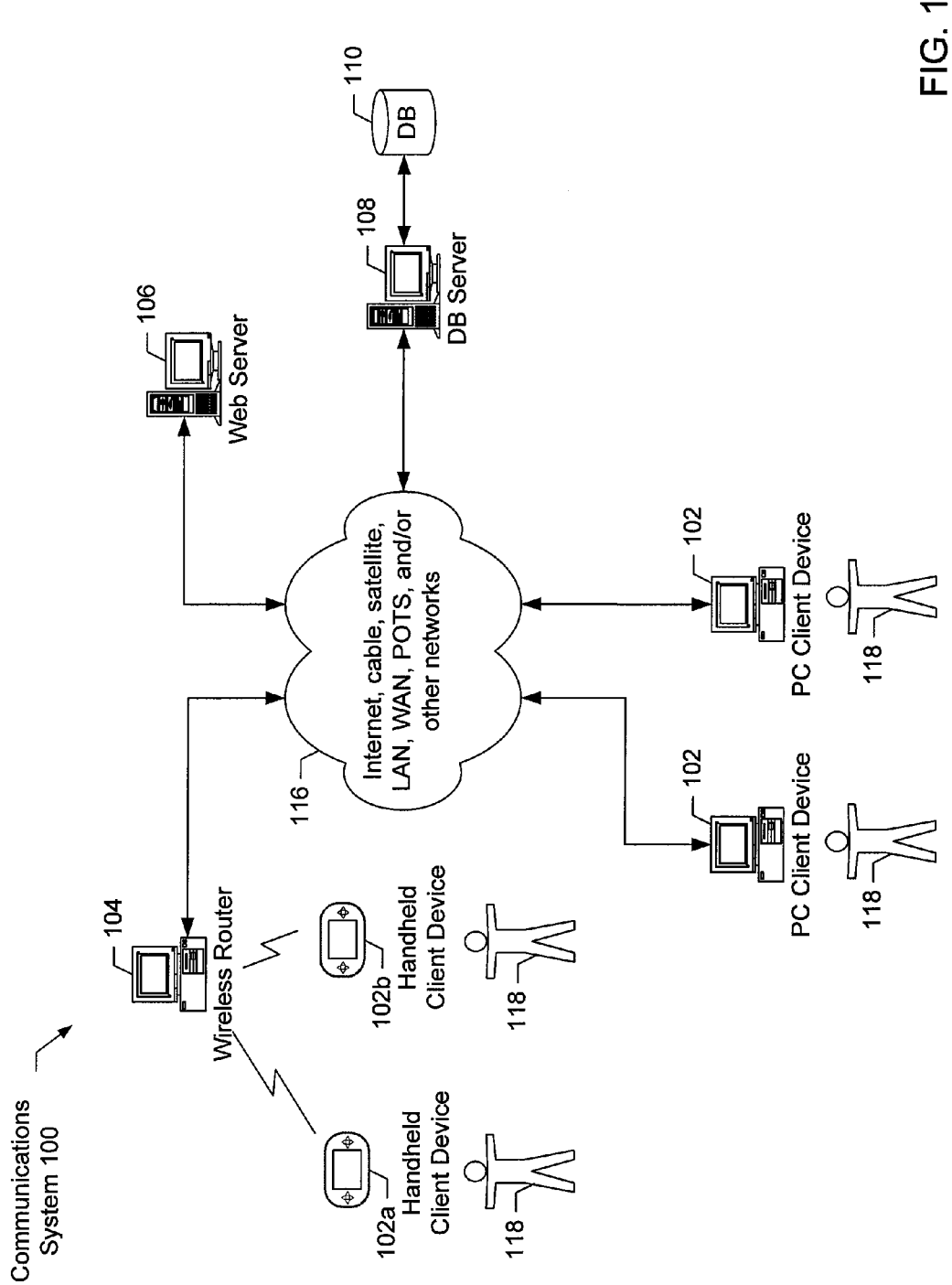
FIG. 1 is a high level block diagram of an example communications system.

The disclosed system is most readily realized in a network communications system. A high level block diagram of an exemplary network communications system 100 is illustrated in FIG. 1. The illustrated system 100 includes one or more client devices 102, one or more wireless routers 104, one or more web servers 106, and one or more database servers 108 connected to one or more databases 110. Each of these devices may communicate with each other via a connection to one or more communications channels 116. The communications channels 116 may be any suitable communications channels 116 such as the Internet, cable, satellite, local area network, wide area networks, telephone networks, etc. It will be appreciated that any of the devices described herein may be directly connected to each other and/or connected over one or more networks.

In an example mode of operation, users 118 of the system 100 consume one or more web pages received from the web server 106. The web pages may be any suitable type of web page such as search engine results. The web pages preferably include advertising content and non-advertising content.

One web server 106 may interact with a large number of client devices 102. Accordingly, each web server 106 is typically a high end computing device with a large storage capacity, one or more fast microprocessors, and one or more high speed network connections. Conversely, relative to a typical web server 106, each client device 102 typically includes less storage capacity, less processing power, and a slower network connection.

Figure 2:
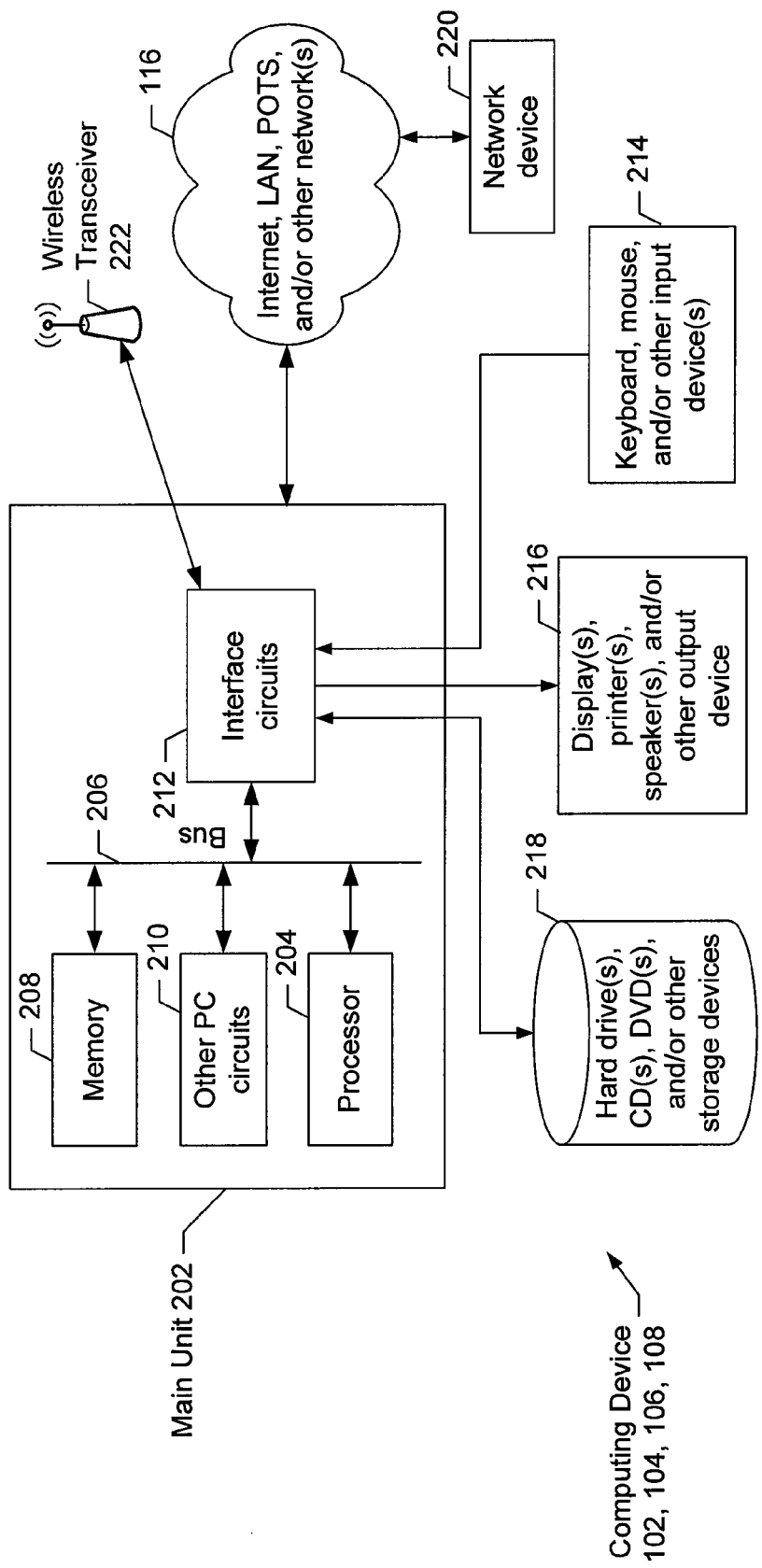
FIG. 2 is a more detailed block diagram showing one example of a computing device.

A detailed block diagram of an example computing device 102, 104, 106, 108 is illustrated in FIG. 2. Each computing device 102, 104, 106, 108 may include a server, a personal computer (PC), a personal digital assistant (PDA), a portable audio player, a portable audio/video player, a mobile telephone, and/or any other suitable computing device. Each computing device 102, 104, 106, 108 preferably includes a main unit 202 which preferably includes one or more processors 204 electrically coupled by an address/data bus 206 to one or more memory devices 208, other computer circuitry 210, and one or more interface circuits 212. The processor 204 may be any suitable microprocessor.

The memory 208 preferably includes volatile memory and non-volatile memory. Preferably, the memory 208 and/or another storage device 218 stores software instructions that interact with the other devices in the system 100 as described herein. These software instructions may be executed by the processor 204 in any suitable manner. The memory 208 and/or another storage device 218 may also store one or more data structures, digital data indicative of documents, files, programs, web pages, etc. retrieved from another computing device 102, 104, 106, 108 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 104, 106, 108. For example, the display 216 may be used to display web pages received from the web server 106. The visual displays may include prompts for human input, run time statistics, calculated values, data, etc.

One or more storage devices 218 may also be connected to the main unit 202 via the interface circuit 212. For example, a hard drive, CD drive, DVD drive, flash memory drive, and/or other storage devices may be connected to the main unit 202. The storage devices 218 may store any type of data used by the computing device 102, 104, 106, 108.

Each computing device 102, 104, 106, 108 may also exchange data with other computing devices 102, 104, 106, 108 and/or other network devices 220 via a connection to the communication channel(s) 116. The communication channel(s) 116 may be any type of network connection, such as an Ethernet connection, WiFi, WiMax, digital subscriber line (DSL), telephone line, coaxial cable, etc. Users of the system 100 may be required to register with the web server 106. In such an instance, each user may choose a user identifier (e.g., email address) and a password which may be required for the activation of services. The user identifier and password may be passed across the communication channel(s) 116 using encryption built into the user's browser, software application, or device. Alternatively, the user identifier and/or password may be assigned by the web server 106.

Figure 3:
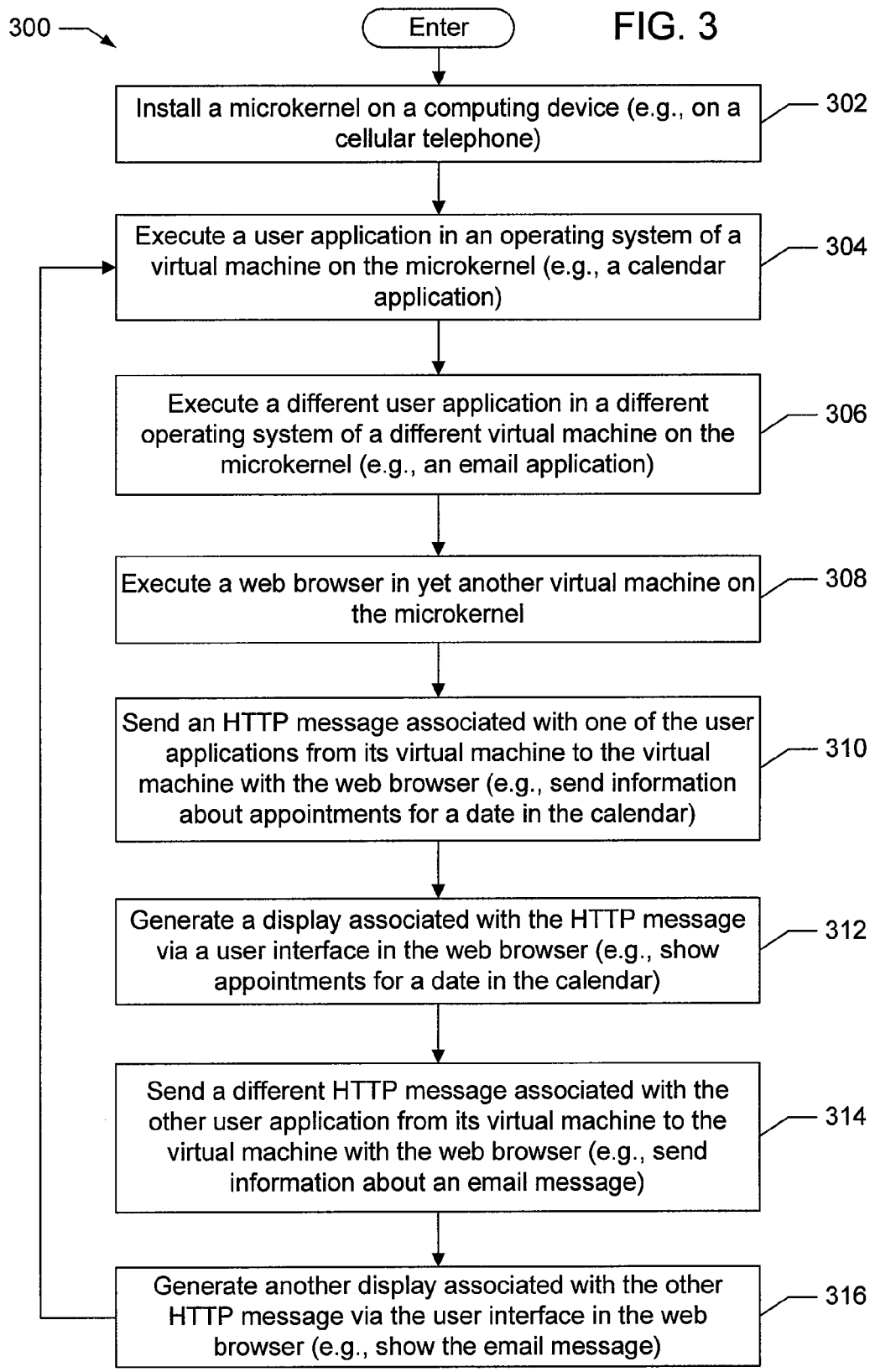
FIG. 3 is a flowchart showing one example of a process for constructing a secure and flexible operating system.
Figure 4:
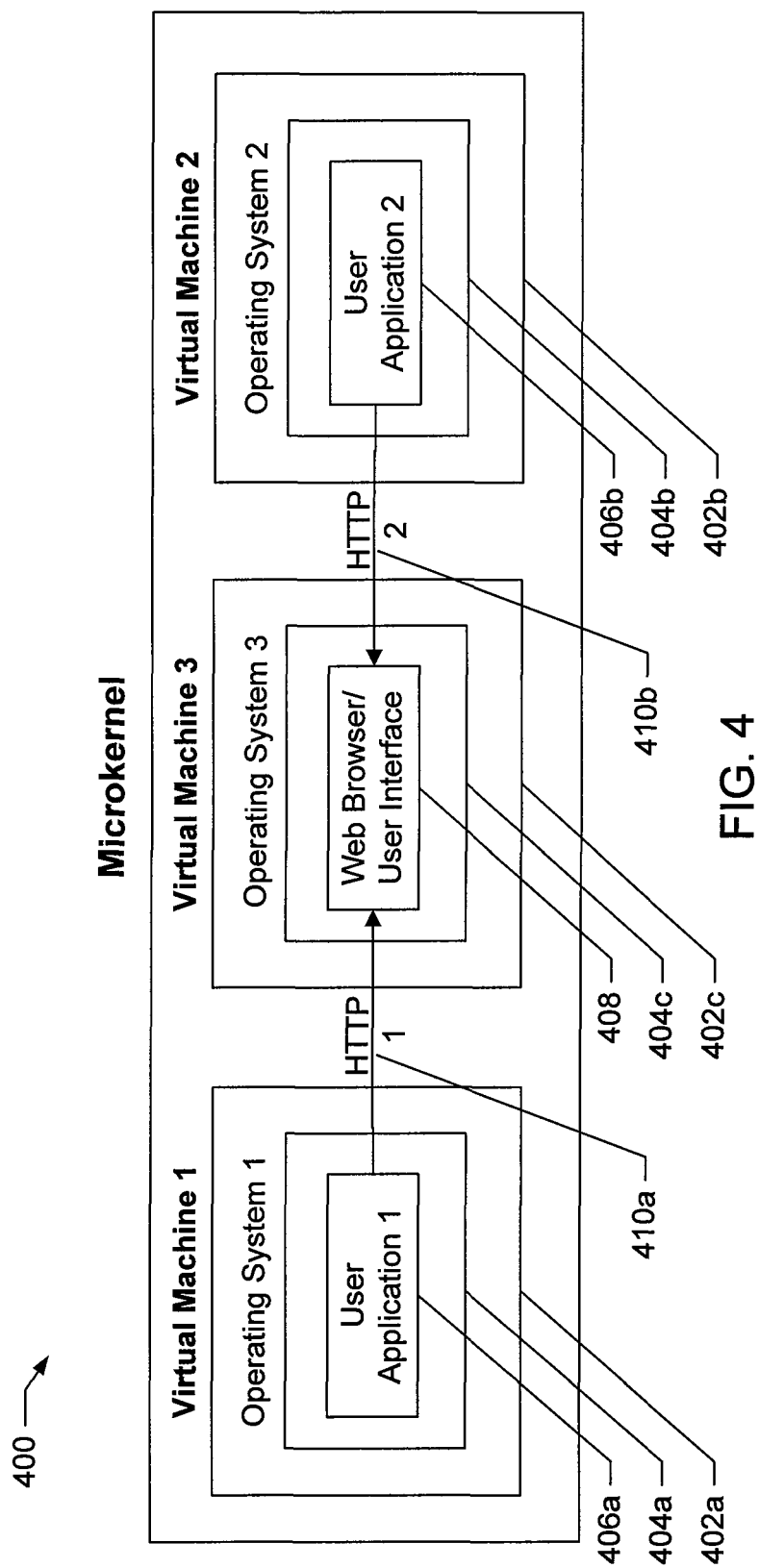
FIG. 4 is a block diagram showing a microkernel and the associated virtual machines, operating systems, user applications, and web browser user interface.

A flowchart of an example process 300 for constructing a secure and flexible operating system is presented in FIG. 3. A block diagram showing a microkernel and the associated virtual machines, operating systems, user applications, and web browser user interface is presented in FIG. 4. Preferably, the process 300 is embodied in one or more software programs which is stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, and some of the steps described may be optional.

In general, the process 300 executes different user applications in different operating systems on different virtual machines. Each user application communicates with other processes via the hypertext transfer protocol (HTTP). In particular, each user application's user interface is implemented in a web browser that is running in its own operating system on its own virtual machine, and each user application interacts with the user interface by exchanging HTTP messages between the virtual machines.

The example process 300 begins when a microkernel 400 is installed on a computing device 102 (block 302). For example, a microkernel 400 may be included in a cellular telephone. Subsequently, a user application 406a is executed in an operating system 404a of a virtual machine 402a on the microkernel 400 (block 304). For example, a calendar application may be executed on a wireless smart phone. In addition, a different user application 406b is executed in a different operating system 404b of a different virtual machine 402b on the microkernel 400 (block 306). For example, an email application may be executed on the smart phone. In yet another virtual machine 402c on the microkernel 400, a web browser 408, such as an embedded web browser, is running (block 308).

When one of the user applications 406a needs to interact with the user 118, the application 406a causes a transport protocol message such as an HTTP message 410a to be sent from its virtual machine 402a to the virtual machine 402c with the web browser 408 (block 310). For example, the calendar application may send information about appointments for a date in the calendar. The HTTP message 410a is then used to generate a display via a user interface in the web browser 408 (block 312). For example, the display may show appointments for a date in the calendar.

For security, underlying security primitives provided by the microkernel may be utilized to restrict HTTP communications. In addition, JavaScript may be executed in the context of the virtual machine and not in the context of the web browser 408.

When another user application 406b needs to interact with the user 118, the application 406b causes a transport protocol message such as an HTTP message 410b to be sent from its virtual machine 402b to the virtual machine 402c with the web browser 408 (block 314). For example, the email application may send information about an email message. The HTTP message 410b is then used to generate another display via the user interface in the web browser 408 (block 314). For example, the display may show the email message.

Of course, a person of ordinary skill in the art will readily appreciate that any number of virtual machines 402, operating systems 404, and user applications 406 may communicate in this manner. In addition, inputs form the user 118 may be communicated to one or more user applications 406 via the user interface in the web browser 408 in the reverse manner.

In summary, persons of ordinary skill in the art will readily appreciate that methods and apparatus for constructing a secure and flexible operating system have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of constructing a secure and flexible operating system, the method comprising:
   installing a microkernel on a computing device;
   executing a first user application in a first operating system of a first virtual machine on the microkernel;
   executing a second different user application in a second different operating system of a second different virtual machine on the microkernel;
   executing a first embedded web browser in a third different virtual machine on the microkernel;
   sending a first message associated with the first user application from the first virtual machine to the third virtual machine using a hypertext transfer protocol (HTTP), wherein the first message includes information for generating a first display;
   generating, based on the information included in the first message, the first display via a user interface in the first embedded web browser in the third different virtual machine;
   sending a second different message associated with the second user application from the second virtual machine to the third virtual machine using the hypertext transfer protocol (HTTP), wherein the second message includes information for generating a second display; and
   generating, based on the information included in the second message, the second display via the user interface in the first embedded web browser in the third different virtual machine.

2. The method of claim 1, wherein installing the microkernel on the computing device includes installing the microkernel on a wireless telephone.

3. The method of claim 1, wherein the third virtual machine is the first virtual machine.

4. The method of claim 1, wherein a security primitive provided by the microkernel restricts a HTTP communication.

5. The method of claim 1, wherein a scripting language is executed in a context of at least one of the virtual machines and not in a context of the first embedded web browser.

6. The method of claim 1, wherein executing the first user application includes implementing the first user application in a second web browser.

7. A computing device including a secure and flexible operating system, the computing device comprising:
- a processor;
- an input device operatively coupled to the processor;
- an output device operatively coupled to the processor; and
- a memory device operatively coupled to the processor, the memory device storing instructions to cause the processor to:
  - operate a microkernel on the computing device;
  - execute a first user application in a first operating system of a first virtual machine on the microkernel;
  - execute a second different user application in a second different operating system of a second different virtual machine on the microkernel;
  - execute a first embedded web browser in a third different virtual machine on the microkernel;
  - send a first message associated with the first user application from the first virtual machine to the third virtual machine using a hypertext transfer protocol (HTTP), wherein the first message includes information for generating a first display;
  - generate, based on the information included in the first message, the first display via a user interface in the first embedded web browser in the third different virtual machine;
  - send a second different message associated with the second user application from the second virtual machine to the third virtual machine using the hypertext transfer protocol (HTTP), wherein the second message includes information for generating a second display; and
  - generate, based on the information included in the second message, the second display via the user interface in the first embedded web browser in the third different virtual machine.

8. The apparatus of claim 7, wherein operating the microkernel on the computing device includes installing the microkernel on a wireless telephone.

9. The apparatus of claim 7, wherein the third virtual machine is the first virtual machine.

10. The apparatus of claim 7, wherein a security primitive provided by the microkernel restricts a HTTP communication.

11. The apparatus of claim 7, wherein a scripting language is executed in a context of at least one of the virtual machines and not in a context of the first embedded web browser.

12. A computer readable memory device storing instructions to cause a computing device to:
- operate a microkernel on the computing device;
- execute a first user application in a first operating system of a first virtual machine on the microkernel;
- execute a second different user application in a second different operating system of a second different virtual machine on the microkernel;
- execute a first embedded web browser in a third different virtual machine on the micro kernel;
- send a first message associated with the first user application from the first virtual machine to the third virtual machine using a hypertext transfer protocol (HTTP), wherein the first message includes information for generating a first display;
- generate, based on the information included in the first message, the first display via a user interface in the first embedded web browser in the third different virtual machine;
- send a second different message associated with the second user application from the second virtual machine to the third virtual machine using the hypertext transfer protocol (HTTP), wherein the second message includes information for generating a second display; and
- generate, based on the information included in the second message, the second display via the user interface in the first embedded web browser in the third different virtual machine.

13. The computer readable memory device of claim 12, wherein operating the microkernel on the computing device includes installing the microkernel on a wireless telephone.

14. The computer readable memory device of claim 12, wherein the third virtual machine is the first virtual machine.

15. The computer readable memory device of claim 12, wherein a security primitive provided by the microkernel restricts a HTTP communication.

16. The computer readable memory device of claim 12, wherein a scripting language is executed in a context of at least one of the virtual machines and not in a context of the first embedded web browser.

* * * * *